FIG. 6b 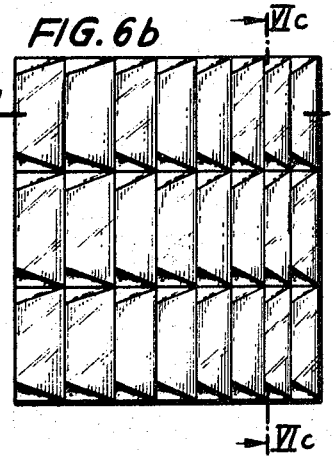 FIG. 6c 

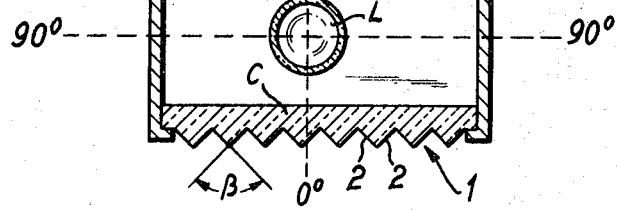
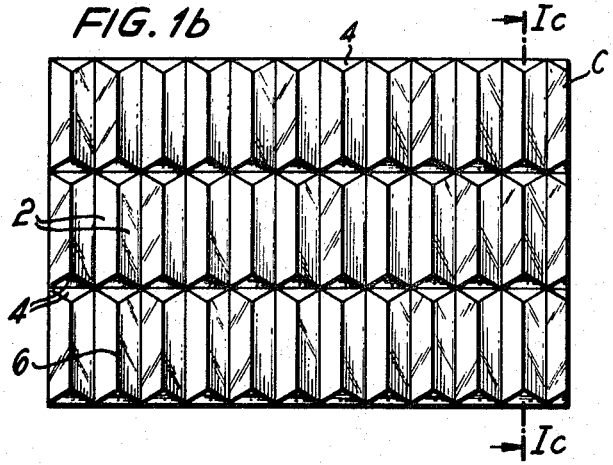
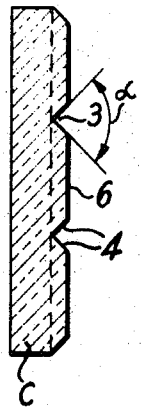
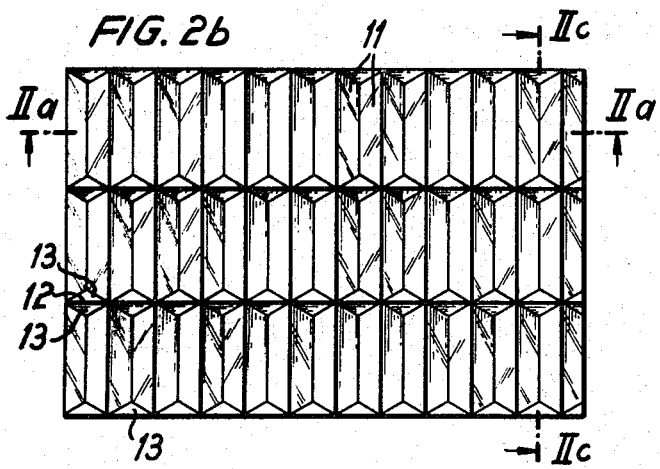
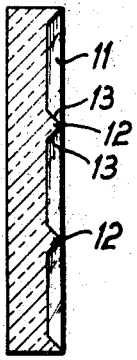
INVENTORS:
Josef MÜLLER
Eberhard LENZE FIG. 3  
FIG. 4 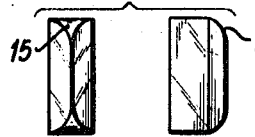 
FIG. 5 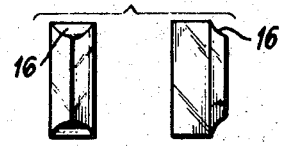 

FIG. 7b 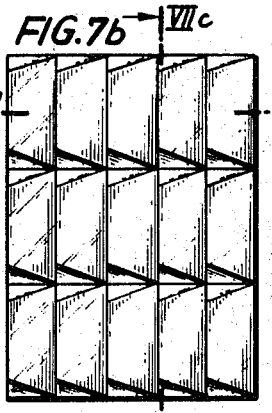 FIG. 7c 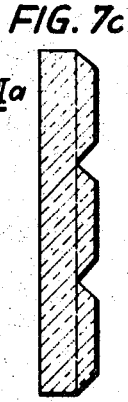

FIG. 8b 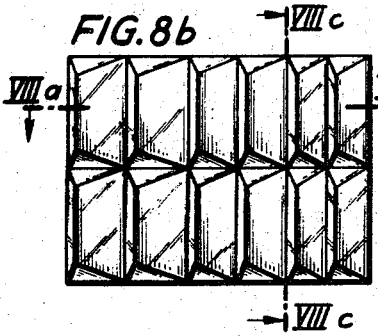 FIG. 8c 

FIG. 9b 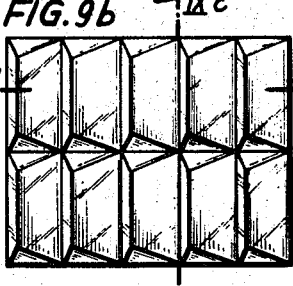 FIG. 9c 

Light distribution curves for a luminous flux of 1000 lumen

Light distribution curves for a luminous flux of 1000 lumen
—— 0°—180° curve A: Light intensities perpendicular to the lamp axis

United States Patent Office 3,532,876
Patented Oct. 6, 1970

3,532,876
LIGHT FITTING HAVING AT LEAST ONE TUBULAR LAMP AND A TRANSPARENT COVERING OF SYNTHETIC RESIN GLASS WITH A PRISMATIC SURFACE
Josef Müller, 64 Feldstrasse, Neheim-Husten 3, Germany, and Eberhard Lenze, Stockhausenweg, Neheim-Husten 2, Germany
Continuation-in-part of application Ser. No. 644,746, May 5, 1967, which is a continuation-in-part of application Ser. No. 398,965, Sept. 24, 1964. This application Dec. 20, 1967, Ser. No. 697,272
Claims priority, application Germany, Oct. 17, 1963, 1,183,035
Int. Cl. F21v 5/00
U.S. Cl. 240—106    7 Claims

ABSTRACT OF THE DISCLOSURE

A light fitting for tubular lamps is provided with a flat, transparent covering having rectilinear rows of prisms extending in the longitudinal direction of the lamps, which rows are traversed by transversely extending rectilinear grooves, the spacing between the transversely extending grooves being larger than the spacing between the longitudinally extending rows of prisms so that individual prismatic elevations or depressions are formed having flat faces and rectangular bases. The prisms are located on the outside surface of the transparent covering. The side ratio of the prisms is preferably from 2:1 to 4:1, and the angle formed by adjacent prism faces is preferably between 110° and 160°. The transparent covering provides an improved distribution of light in which high luminous intensities are obtained in the radiation angle range of 0° to 45°, with smoothly decreasing luminous intensities in the radiation angle range of 45° to 60°, and significantly reduced luminous intensities in the radiation angle range of 60° to 90°.

CROSS REFERENCE TO RELATED APPLICATION

This application is a continuation-in-part of our copending application Ser. No. 644,746, filed on May 5, 1967, now abandoned, which in turn is a continuation-in-part of our application Ser. No. 398,965, filed Sept. 24, 1964, now abandoned for a Light Fitting Having at Least One Tubular Lamp and a Transparent Covering of Synthetic Resin Glass With a Prismatic Surface.

BACKGROUND OF THE INVENTION

This invention relates to a light fitting having at least one tubular lamp and a transparent covering of synthetic resin glass with a prismatic surface.

It is known to provide light fittings having tubular lamps, especially fluorescent tubes, with coverings of transparent synthetic resin glass which on one surface are provided with rows of prisms extending in the longitudinal direction, i.e., in the lamp direction. As a rule, such longitudinally extending rows of prisms have the cross section of an isosceles triangle. The rows of prisms provide for better distribution of the light transversely of the lamp axis and in a downwardly directed angle region. Thus it is possible to direct the light emanating from the lamps in preferred directions and to shade off other directions.

As a modification of the known longitudinally extending contiuous prisms, stepped prisms are known which are also continuous in profile. In these prisms, light distribution is similar to the light distribution in the aforementioned prisms. Now, all continuous rows of prisms have the disadvantage that they give a relatively clear insight into the interior of the fitting, so that the built-in parts of the latter are visible in a manner not desired.

To obtain prismatic surfaces, it is already known to provide transversely extending grooves in addition to the longitudinally extending continuous rows of prisms, which grooves are also of triangular cross section so that pyramidal prismatic elevations are formed which have a square area. Instead of the transverse grooves, it is also possible to provide ridges, in which case the same square area pyramids are formed, but as prismatic depressions. Moreover, it is known to arrange individual lens-shaped or arched prismatic elevations or depressions having a circular or elliptical area. In all cases of individual prisms, insight into the interior of the light fitting is substantially prevented. But the desired distribution of light transversely of the lamp axis and downwardly in angle regions (downwardly widespread illumination) cannot be attained by these known individual prisms.

SUMMARY OF THE INVENTION

It is the object of the present invention to design the prismatic surface of the transparent plastic lamp covering so that, on the one hand, the required downwardly widespread illumination is obtained and that, on the other hand, insight into the interior of the light fitting is prevented.

This object is attained by the provision of a light fitting having at least one tubular lamp, especially fluorescent tube, and a transparent covering of a synthetic resin glass, which is provided on one surface with rows of prisms extending parallel to the longitudinal direction of the lamp and crossed by transversely extending prism grooves or rows, which is characterized in that the spacing between the transversely extending prism grooves or rows is larger than the spacing between the longitudinally extending prisms to such an extent that individual prismatic elevations or depressions are formed which have a rectangular base and a side ratio of 1:2 to 1:4.

Preferably, the prismatic elevations or depressions substantially have the shape of an Italian roof, the ridge of which extends parallel to the longitudinal direction of the lamp.

On principle, the invention thus starts from the known longitudinally extending rows of prisms. The extension of the longitudinal rows of prisms is interrupted, it is true, by the transversely extending prismatic grooves or ridges, but such interruption takes place at considerably larger intervals than in the hitherto known cases and in such a manner that rectangles are formed which have sides in the above-mentioned ratio. Contrary to continuous rows of prisms, this design has surprisingly proved to prevent to a large extent insight into the interior of the light fitting while attaining, at the same time, substantially the same downwardly widespread illumination as in the case of continuous rows of prisms. This is due to the fact that measures proposed by the invention work out to the effect that the lateral prism faces, which reflect the light transversely of the longitudinal axis of the lamp, are enlarged, whereas the end faces of the prisms, which reflect the light towards the ends of the fitting, are reduced in surface area.

This ratio can still be increased by providing relatively flat transverse reflecting lateral prism faces and relatively steep endwise reflecting faces.

BRIEF DESCRIPTION OF THE DRAWINGS

FIG. 1a is a cross-sectional view of a tubular lamp with a flat, transparent covering made in accordance with the invention;

FIG. 1b is a bottom plan view of the transparent covering made in accordance with the invention;

FIG. 1c is a longitudinal sectional view taken on the line Ic—Ic of FIG. 1b;

FIG. 2a is a cross-sectional view taken on the line IIa—IIa of FIG. 2b;

FIG. 2b is a bottom plan view of a modified structure;

FIG. 2c is a longitudinal sectional view taken on the line IIc—IIc of FIG. 2b;

FIG. 3 is a bottom, side and end view of a modified form showing only one prism for economy of drawing surface;

FIG. 4 is a bottom, side and end view of a single prism of another modification;

FIG. 5 is a bottom, side and end view of a single prism of still another modification;

FIGS. 6a, 6b and 6c are cross-sectional, bottom plan and longitudinal sectional views, respectively, of a saw tooth form of prism;

FIGS. 7a, 7b and 7c are cross-sectional, bottom plan and longitudinal sectional views, respectively, of a modified form of saw tooth prism;

FIGS. 8a, 8b and 8c are cross-sectional, bottom plan and longitudinal sectional views, respectively, of another modified form of saw tooth prism;

FIGS. 9a, 9b and 9c are cross-sectional, bottom plan and longitudinal sectional views, respectively, of still another modified form of saw tooth prism.

DESCRIPTION OF THE PREFERRED EMBODIMENTS

Figure 6A:
Figure 7A:
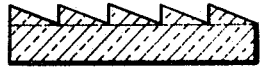
Figure 8A:
Figure 9A:

Referring to FIG. 1a, one illustrative embodiment of the invention is indicated schematically as including a light housing H containing a tubular lamp L and a transparent covering C having longitudinally extending rows of prisms 1 with lateral faces 2. The shape and distribution of the prisms is shown in plan view in FIG. 1b and in longitudinal sectional view in FIG. 1c. Triangular grooves 3 extend transversely thereof and define end faces 4 of the prisms. The spacing and angles of the grooves 3 are chosen so that on a rectangular base there are formed prismatic elevations having the shape of an Italian roof with a ridge 6 extending in each case in the longitudinal direction of the lamp. Apex angle α of the grooves 3 may be smaller than apex angle β of the prisms 1.

Referring to the embodiments of FIGS. 2a, 2b and 2c, longitudinally extending rows of prisms 10 having faces 11 are crossed by transversely extending rows of prisms 12 having faces 13. By this arrangement, prismatic depressions are obtained which have the same shape as in FIG. 1b.

The optical effect of prismatic elevations and depressions is in either case the same when such elevations and depressions have the same shape and dimensions. As to their cleaning, however, elevations are more advantageous. For the rest, the question whether to choose elevations or depressions will be answered by considerations concerned with the tool making.

The prismatic elevation shown in FIG. 3 is a pyramid having a rectangular area or base.

The prismatic forms of FIGS. 4 and 5 are again of the Italian roof type with longitudinal ridges but provided with convex or concave end faces 15 and 16, respectively, which are to reflect light towards the ends of the lamp.

In the embodiments shown in FIGS 6a through 9c, the lateral faces on the one side of the longitudinally extending rows of prisms are flatter than the lateral faces on the other side thereof. Thus, a saw tooth cross-section is obtained. The advantage of this design is that the surfaces reflecting the light towards one lateral side are larger than the surfaces reflecting it towards the other lateral side. These latter surfaces are shortest in the modifications shown in FIGS. 6 and 7, where they are vertical.

In FIGS. 6a–6c and 8a–8c, the width of the longitudinally extending rows of prisms increases from right to left so that the prism faces directed towards the right become increasingly flatter. This measure serves to concentrate the light in certain perpendicular angle regions.

In designing lamp coverings with prismatic surfaces it it is desired to attain the so-called brilliance effect by employing technical means. What is to be understood by this term is the influence exerted on the eye by a plurality of surfaces each having a different luminous density. The known square area pyramidal prisms frequently fail to produce the brilliance effect since each of the four equal pyramidal faces is too small to be resolved by the eye with regard to its luminous effect, i.e., to be precisely seized in accordance with its brightness. The sum of the prisms often is comprehended by the eye only in a uniform brightness. By using the roof shape proposed by the present invention, conditions are provided which are far more suitable with regard to the brillliance effect, since by changing over from pyramidal to roof shape, while maintaining the height of the prisms, the faces reflecting transversely of the longitudinal direction of the lamp are considerably enlarged. The faces of the prisms that produce the brilliance effect can be further enlarged by providing, for example, that the end faces 4 meet at an acute angle and the lateral faces 2 at an obtuse angle.

If the lamp covering is to have individual prisms in the form of elevations, the corresponding recess in the tool required for the manufacture can be produced by means of a bevelled cutter. In this case, for producing a recess the cutter is made to penetrate in the tool surface and then is shifted by the length to be given to the roof. In this manner, roof-shaped recesses are formed in the tool, which have a substantially rectangular area and large relatively plane lateral faces, whereas the smaller end faces of the roofs are not plane but conically arched. Coverings that have been manufactured with such tools will have prismatic elevations of the same shape.

Figure 10:
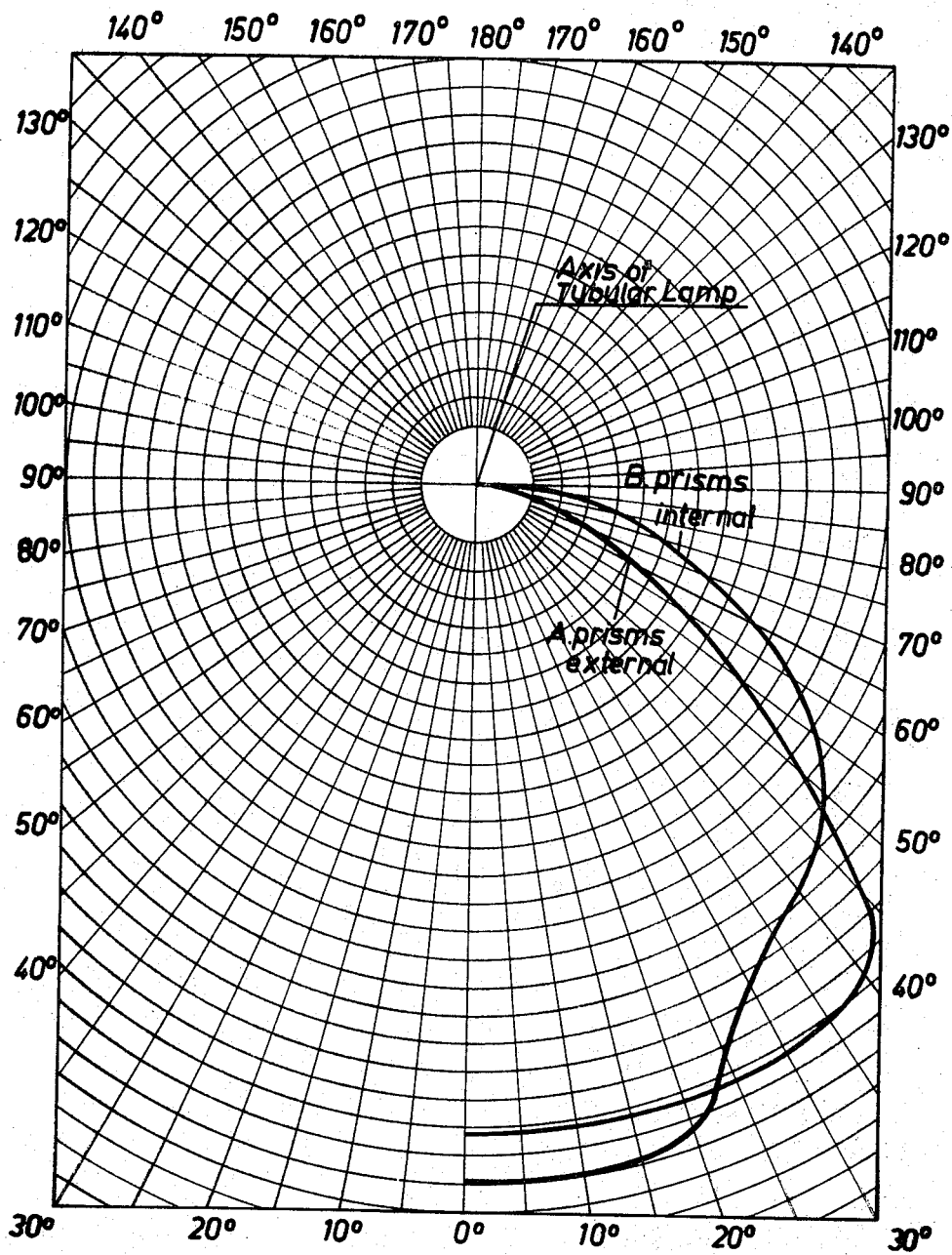
FIGS. 10 and 11 are light distribution curves showing the improved light distribution achieved in accordance with this invention.
Figure 11:
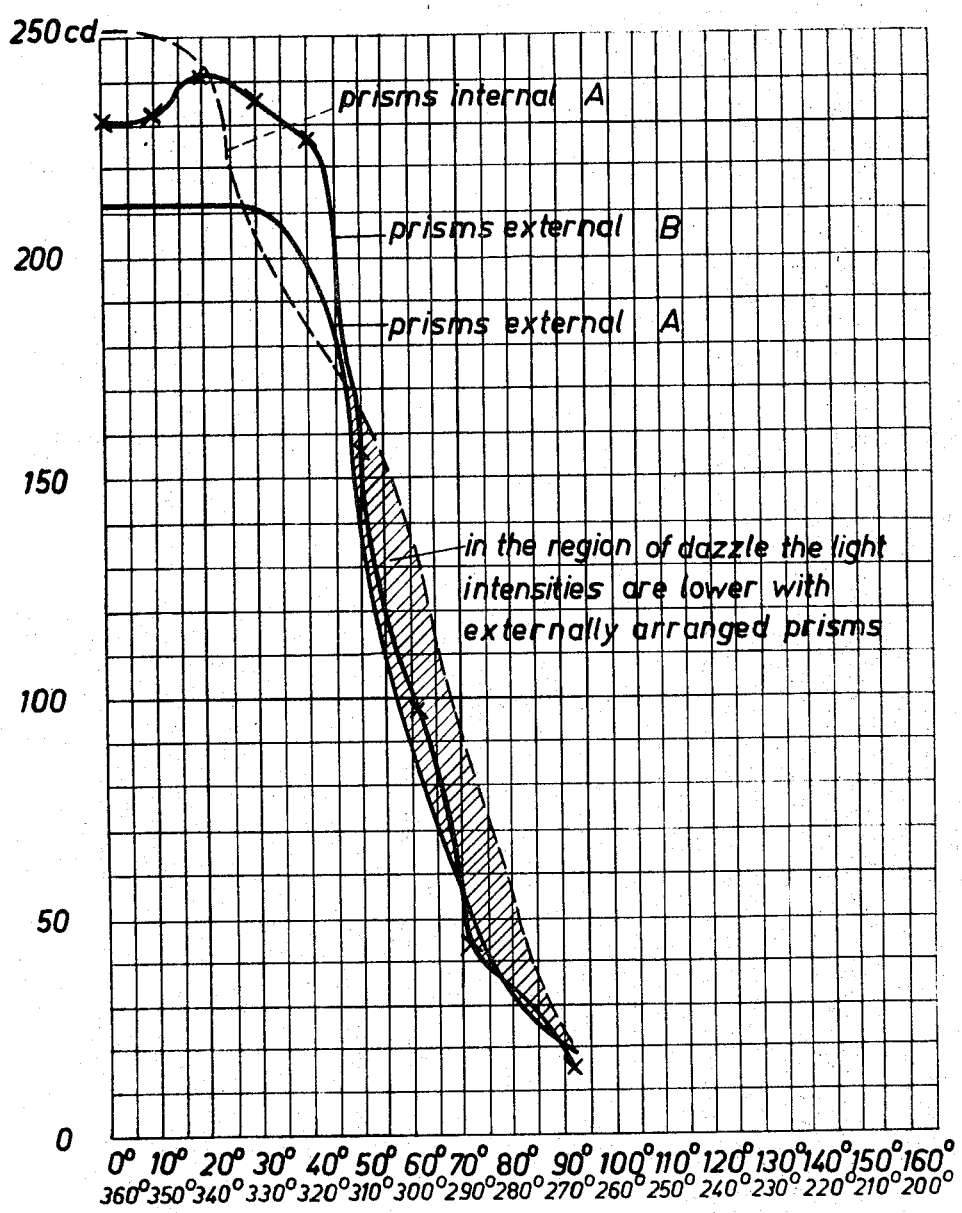

The improved light distribution which is provided by the prisms of this invention is shown by the experimental curves of FIGS. 10 and 11. As can be seen in these curves, the prisms of this invention, when oriented outwardly, provide high luminous intensities in the radiation angle range of 0° to 45°, with smoothly decreasing luminous intensities in the radiation angle range of 45° to 60°, and significantly reduced luminous intensities in the radiation range of 60° to 90°.

The invention may be embodied in other specific forms without departing from the sipirt or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A light fitting for enclosing at least one elongated tubular lamp comprising:
   (a) means mounting at least one lamp in a housing having a flat transparent covering,
   (b) the outer surface of said covering having only rectilinear rows of prisms extending in the longitudinal direction of the tubular lamp,
   (c) said rows of prisms being traversed only by laterally spaced transversely extending rectilinear grooves,
   (d) the spacing between the transversely extending grooves being larger than the spacing between the longitudinally extending rows of prisms to form individual prismatic elevations or depressions having a rectangular base, (e) said rectangular bases having a side ratio from about 2:1 to 4:1,
(f) the longitudinal faces of said prisms being flat and the adjoining longitudinal prism faces forming an angle between 110° and 160°.

2. A light fitting as defined in claim 1, wherein the prismatic elevations or depressions substantially have the transverse cross-sectional shape of an Italian roof, the ridge of which extends parallel to the longitudinal direction of the lamp.

3. A light fitting as defined in claim 1, wherein the faces reflecting the light in the longitudinal direction are of concave configuration.

4. A light fitting as defined in claim 1, wherein the faces reflecting the light in the longitudinal direction are of convex configuration.

5. A light fitting as defined in claim 2, wherein the faces reflecting the light in the longitudinal direction are steeper than the faces reflecting the light in the transverse direction.

6. A light fitting as defined in claim 1, wherein the lateral faces of the prisms have a saw tooth cross-section so that the lateral faces on the one side, which is the direction of principal light reflection, are flatter than the faces on the other side.

7. A light fitting as defined in claim 6, wherein the angles of inclination of the flatter lateral faces continuously vary in the transverse direction.

References Cited

UNITED STATES PATENTS

| | | | |
|---|---|---|---|
| 988,488 | 4/1911 | Mygatt | 240—106 |
| 2,558,422 | 6/1951 | De Leo | 240—41.4 |
| 2,566,126 | 8/1951 | Franck | 240—25 |
| 2,904,673 | 9/1959 | Guth | 240—78 |
| 3,129,895 | 4/1964 | Franck | 240—106 |
| 3,265,887 | 8/1966 | Wince | 240—51.11 |

NORTON ANSHER, Primary Examiner

R. M. SHEER, Assistant Examiner

U.S. Cl. X.R.

240—51.11